May 23, 1939.  C. A. TSCHÖRTNER  2,159,574
SMALL-FILM CINE CAMERA
Filed Sept. 23, 1937    2 Sheets-Sheet 1

Inventor:
Carl Aug. Tschörtner

May 23, 1939.  C. A. TSCHÖRTNER  2,159,574
SMALL-FILM CINE CAMERA
Filed Sept. 23, 1937  2 Sheets-Sheet 2

Inventor:
Carl Aug. Tschörtner

Patented May 23, 1939

2,159,574

UNITED STATES PATENT OFFICE 2,159,574

SMALL-FILM CINE CAMERA

Carl August Tschörtner, Cologne-on-the-Rhine, Germany

Application September 23, 1937, Serial No. 165,396
In Germany September 26, 1936

2 Claims. (Cl. 88—17)

The invention relates to a small-film camera in which the movement of the film is produced by means of a spring-actuated driving device. Cameras of this kind are heretofore performed as cubical casings. The use of such cameras when off-hand operating the same has the disadvantage, that on account of the necessary spread position of the fingers the hands of the operator find unfavorable faces of application so that in consequence of the insecure support of the camera, bad photographic views are produced.

These disadvantages are obviated according to the invention by forming the casing of the film-camera as a box of flat rectangular shape, the longitudinal walls of which have a horizontal position and the bottom of which forms the front-wall. In this case the film rollers are positioned in the interior in such a manner that their shafts are arranged close to the film-guidance on both sides of the same. The film is supplied to this device and removed from the same by forming a compensating loop.

The difficulties in the arrangement of the driving apparatus arising in such a formation are obviated by using as driving apparatus a spring-actuated mechanism provided with two plane bearing plates which may be mounted in the casing parallel to the bottom-wall, so that the driving and intermediate shafts are directed parallel to the axis of the objective lens. An objective lens holder shaped as a sleeve and provided at its rear end enlarged to a flange with the film guiding platform is placed in the room of the driving mechanism. This holder enables without regard to accurate fitting of the mechanism an exact adjustment of the objective lens and establishes at the same time a connection between the film-guidance or the gate aperture and that parts of the mechanism necessary for the film movement, that is the gripper and the intermediate winding rollers which may be easily adjusted.

In the accompanying drawings a small-film camera performed according to the invention is shown by way of example.

Figure 1:
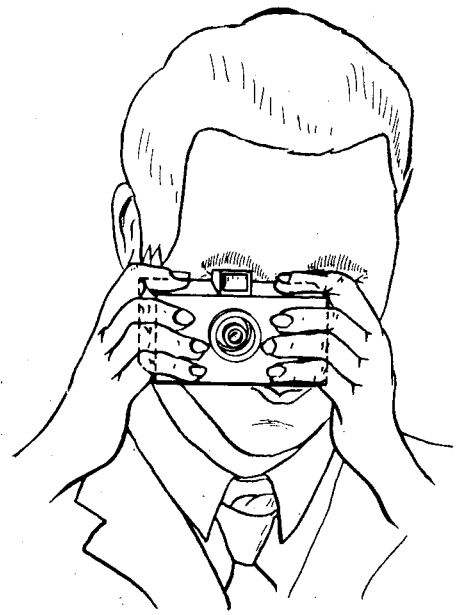
Fig. 1 is a perspective view of the camera in the operative position.
Figure 2:
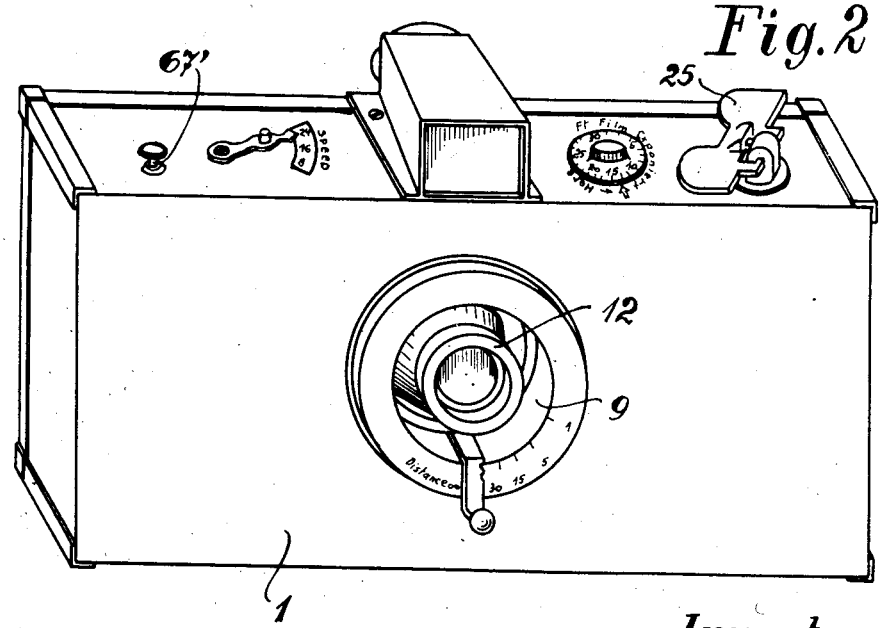
Fig. 2 is a perspective front elevation.
Figure 3:
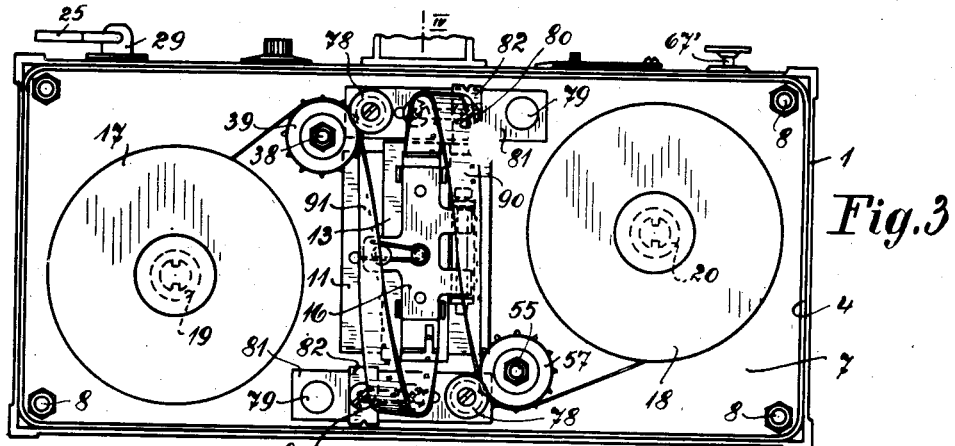
Figure 5:
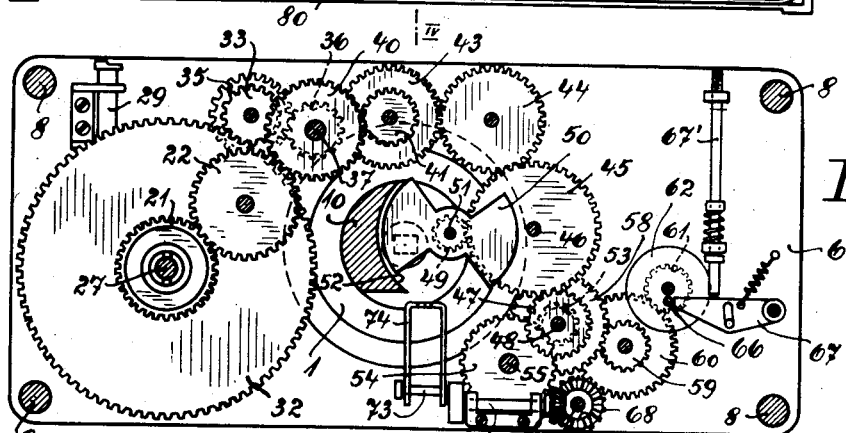
Figure 6:
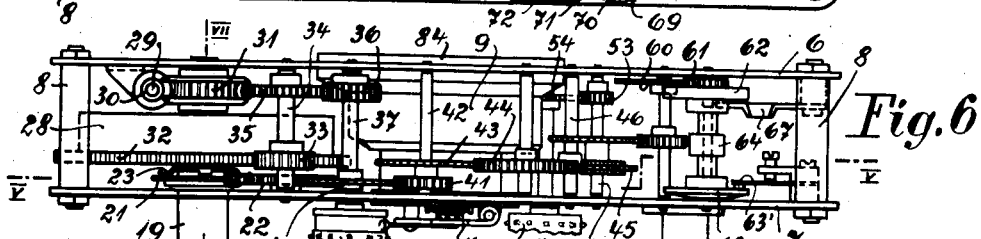
Figures 4, 7:
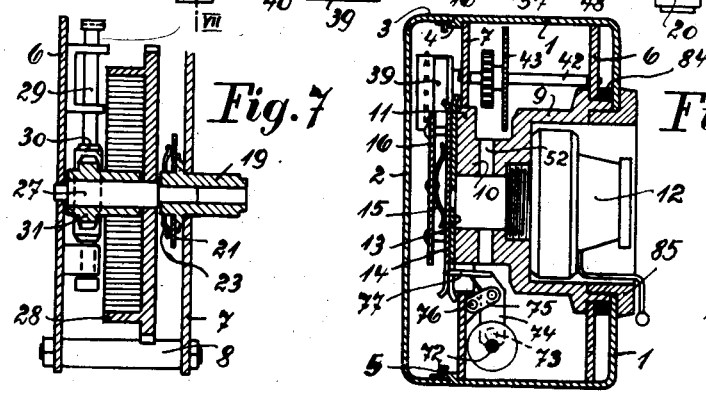

Fig. 3 a longitudinal elevation with the rear wall removed,

Fig. 4 is a section to the line IV—IV of Fig. 3,

Fig. 5 a longitudinal section through the movement to the line V—V of Fig. 6,

Fig. 6 a plan view with the casing removed and

Fig. 7 a cross-section through the movement to the line VII—VII of Fig. 6.

The casing 1 has a lid 2 seizing with its edge 3 over a ledge 4 and being held removably. Light-tightness of the joint is obtained by means of a tightening disc 5.

The spring-operated driving mechanism consists of two bearing-plates 6 and 7 connected to each other by bolts 8. To the front bearing-plate 6 the holder 9 of the objective lens is secured having a neck-shaped groove and in the plane of the second bearing-plate 7 a flange 11. The objective lens 12 is arranged in the cavity of the holder for the objective lens. The flange 11 carries the film-guiding device consisting of a plate 13 containing the gate aperture, of a pressing plate 14 and of a supporting plate 16 being movable as a hinge and carrying the pressure-spring. Near the film-way two bolts 19, 20 are arranged upon which the film rollers 17, 18 are placed. Furthermore a transporting or conveying roller 57 and a conveying roller 39 are provided for leading the film to and from the gate aperture.

The spring-operated driving mechanism for the film-movement consists of a driving spring arranged on the driving shaft 27 and enclosed in a casing 28 which spring is connected by means of worm 30 and of a worm-wheel 31 secured to the shaft 27 to the operating shaft 29 and may be tightened by the aid of a handle 25. A driving spur-wheel 32 connected to the spring engages a spur-wheel 33 on the intermediate shaft 34 carrying a second spur-wheel 35. This latter is in engagement with a spur-wheel 36 on the shaft 37 carrying at its end 38 the conveying roller 39 for the film leaving the gate aperture. Furthermore on the said shaft 37 a driving gear wheel 40 is secured which meshes with the intermediate gear wheel 41 on the shaft 42. This gear wheel transmits the driving force by means of the wheel 43 on the shaft 42 which meshes with the wheel 44 being in engagement with the wheel 45 on the shaft 46. The latter wheel drives an intermediate wheel 47 on the shaft 48 and the spur-wheel 49 of the rotary shutter 50.

This shutter 50 is arranged on a shaft 51 secured in the holder 9 of the objective lens and enters the space in front of the gate aperture through a slot 52 of the neck-shaped portion 10. On the shaft 48 near the intermediate wheel 47 is arranged a spur-wheel 53 engaging with a driving spur-wheel 54 arranged on the shaft 55. The shaft 55 is arranged symmetrically to the centre of the objective lens as a counterpart to the shaft 37, projects with its end pivot beyond the bearing-plate and carries the top sprocket 57 for that end of the film approaching to the gate aperture. Through the pairs of gear wheels 58, 59 and 60, 61 a connection of the driving mechanism with a centrifugal governor 62, 63, 64 is provided.

The governor is composed of a shaft 65 upon which the hub 62 is secured while the braking-disc 63 is slidably arranged on the said shaft. Between both parts plate-springs 64 provided with centrifugal weights are arranged. When put in rapid revolution the latter draw the braking-disc 63 towards an adjustable braking-block 63' by bending outwards their bodies, so that a determined running speed is obtained. To the hub 62 a pin 66 is secured abutting against the releasing lever 67 and locks the mechanism. When pushing down the lever 67 by means of the releasing spindle 67' the latter releases the pin, so that the mechanism may begin to work.

By the gear-wheel 60 furthermore a shaft 70 carrying the bevel-gear 69 is rotated by means of the spur-wheel 68. A second bevel-gear 71 transmits this rotation to the gripper shaft 72 to the crank 73 of which the gripper 74 is connected. The gripper 74 is journaled at its upper end in a link 75, the end 76 of which is rotatably journaled in the bearing-plate 7. The tooth 77 of the gripper projects through a slot through the flange 11 of the holder 9 of the objective lens towards the plane of the film. Preferably the gripper is secured for itself to a support in order that the bearing of the gripper and thereby the touch of the picture may be exactly adjusted.

For each of the two sprockets 57, 39 a pressure roller 78 is provided which may be shifted for the insertion of the film. For this purpose the sprockets are secured to sliding-plates 81 being guided by two holding-screws 80. An elastic notched disc 82 holds the sliding-plates fast in the pressed position.

The operation of the device may be understood without ado from the foregoing specification. The film is led from the roller 18 over the sprocket 57 and from there guided with a loop 90 in a half twist to the upper end of the film-guidance 14, 13. After having passed this guidance the film is led in a second loop 91 to the sprocket 39 and from there to the empty roller 17. If the releasing lever 67 is depressed the film will be continuously pulled off, the loop in the guidance exposed through the gate aperture, moved step by step by the gripper 67 and finally sized by the bottom sprocket 39 and led again in a uniform movement to the empty roller 17. The shaft of this latter is driven by means of a gear wheel 21 which is frictionally held on the sleeve 19 by the aid of a claw-spring 23 and which is connected to the wheel 40 on the driven shaft 37 by means of another gear wheel 24. The winding up of the exposed film is effected in known manner by the somewhat quicker rotation of the roller with a certain tension.

In the shown example the driving mechanism is secured at its four corners to the bolts 8 by means of the nuts. In the middle of the bearing plate 6 the holder 9 of the objective lens is secured by means of a clamping ring 84. A flanged ring 85 screwed into the sleeve of the objective lens holder effects a further reciprocal fastening of the parts.

In the device shown for example in the drawings a small film with a width of 8 mm. perforated at one side is used. With little variations in the dimensions in the same apparatus also films of the double width or of a width of 9½ mm. may be used.

The winding shaft 29 of the driving spring is continued beyond the upper small side of the casing for the purpose of an easier operation of the apparatus if the same is enclosed in a pocket. Also the releasing spindle 86 is elongated towards above in order that the apparatus may be conveniently supported by the hand and that an easy releasing movement is possible.

What I claim is:

1. A miniature motion picture camera, comprising a flat rectangular casing having broad front and rear walls and narrow top, bottom and end walls, a lens holding sleeve extending through said front and rear walls at right angles thereto and centrally thereof, a lens carried by the forward portion of said sleeve, a rear portion of said sleeve being slotted, film guides carried by the extended rear end of said sleeve, film holding spools mounted outwardly of said rear wall of said casing on either side of said guides, a light tight cover mounted on the outside of said rear wall and enclosing said spools and guides, means in said casing for imparting a step by step movement of said film through said guides, a shutter in said casing and working in said slotted portion of said sleeve, and spring means in said casing and operatively connected to both said shutter and film moving means for actuating the same.

2. In a camera, a casing, a lens opening through one wall of said casing, a film guide supported in said casing rearwardly of said lens and extending vertically of the casing behind the lens, said film guide having a gate at each end thereof, a pair of film reels supported in said casing closely adjacent the film guide on opposite sides thereof, one of said reels being arranged to carry unexposed film and the other of said reels being arranged to carry exposed film, a pair of idler sprockets each arranged in laterally spaced relation to a respective end of the film guide and adjacent that end of the film guide remote from the gate wherethrough film extending from a respective reel around the sprocket to said gate passes, whereby the film from each sprocket extends from the sprocket vertically along said guide to enter the gate at the opposite end from said sprocket.

CARL AUG. TSCHÖRTNER.